(12) United States Patent
Skigen et al.

(10) Patent No.: US 7,947,146 B2
(45) Date of Patent: May 24, 2011

(54) PLASTIC CARPULE AND METHOD OF MANUFACTURE

(76) Inventors: Andrew Skigen, Jacksonville, FL (US); Art Molino, Jacksonville, FL (US); Craig Kroeger, Annandale, MN (US)

( * ) Notice: Subject to any disclaimer, the term of this patent is extended or adjusted under 35 U.S.C. 154(b) by 0 days.

(21) Appl. No.: 12/807,341

(22) Filed: Sep. 2, 2010

(65) Prior Publication Data

US 2011/0052849 A1    Mar. 3, 2011

Related U.S. Application Data

(62) Division of application No. 12/002,629, filed on Dec. 18, 2007, now Pat. No. 7,790,257.

(60) Provisional application No. 60/875,759, filed on Dec. 19, 2006.

(51) Int. Cl.
*B29C 65/00* (2006.01)

(52) U.S. Cl. .......... 156/304.2; 156/304.1; 264/453; 264/645

(58) Field of Classification Search .......... 156/304.2, 156/304.1; 264/453, 645
See application file for complete search history.

(56) References Cited

U.S. PATENT DOCUMENTS

| | | | |
|---|---|---|---|
| 1,715,771 | A | 6/1929 | MacGregor |
| 1,737,844 | A | 12/1929 | Heineman |
| 2,007,454 | A | 7/1935 | May |
| 2,020,828 | A | 11/1935 | Goldberg |
| 2,338,102 | A | 1/1944 | Fields |
| 2,705,956 | A | 4/1955 | McLaughlin |
| 3,919,374 | A | 11/1975 | Komendowski |
| 4,219,912 | A | 9/1980 | Adams |
| 4,254,884 | A | 3/1981 | Maruyama |
| 4,724,028 | A | 2/1988 | Zabielski et al. |
| 4,984,415 | A | 1/1991 | Kuroda |
| 5,088,995 | A | 2/1992 | Packard et al. |
| 5,368,801 | A | 11/1994 | Vaillancourt |
| 5,647,939 | A | 7/1997 | Gee et al. |
| 6,065,270 | A | 5/2000 | Reinhard et al. |
| 6,243,938 | B1 | 6/2001 | Lubrecht |
| 6,270,473 | B1 | 8/2001 | Schwebel |
| 6,681,475 | B2 | 1/2004 | Thibault et al. |

*Primary Examiner* — Michael C Miggins
(74) *Attorney, Agent, or Firm* — Thomas C. Saitta

(57) ABSTRACT

A carpule and its method of manufacture, the carpule tubular body composed of a polypropylene or similar polymer, the tubular body being sealed at one end by a seal of a thermoplastic vulcanizate (TPV) or similar polymer, the seal having been injection molded in contact with the tubular body prior to full curing of the material composing the tubular body, such that a chemical fusion bond is created between the seal and the tubular body.

14 Claims, 5 Drawing Sheets

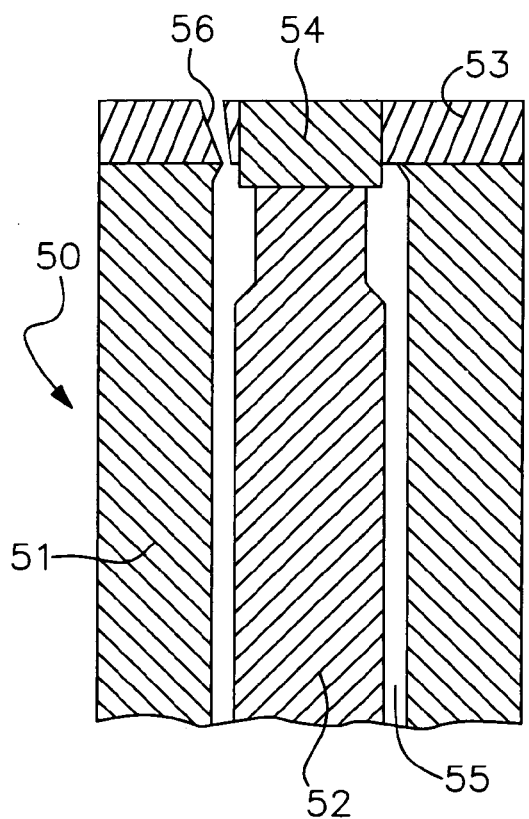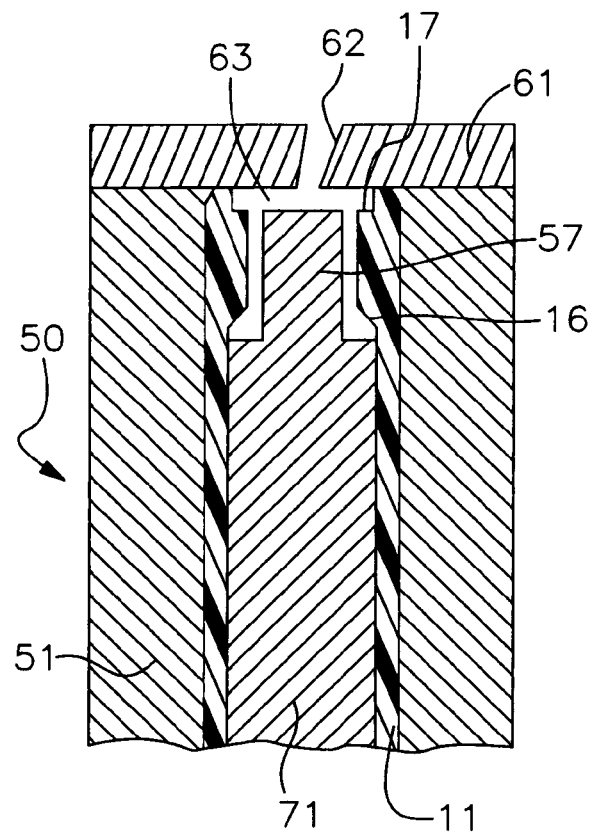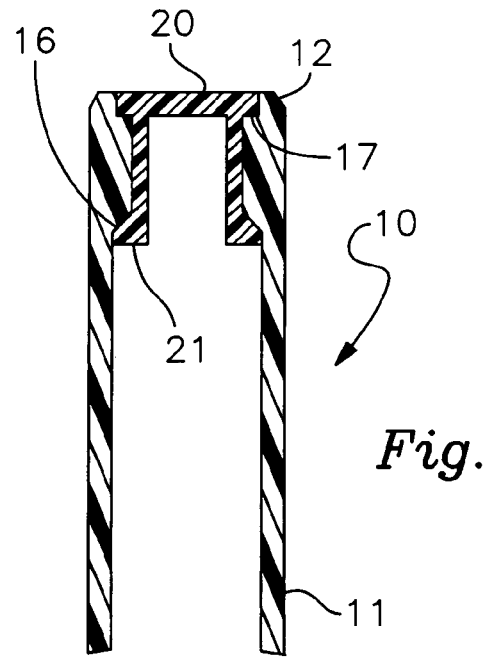

PLASTIC CARPULE AND METHOD OF MANUFACTURE

This application is a divisional application of U.S. patent application Ser. No. 12/002,629, filed Dec. 18, 2007, now U.S. Pat. No. 7,790,257, and claims the benefit of U.S. Provisional Patent Application Ser. No. 60/875,759, filed Dec. 19, 2006, the disclosure of which is incorporated by reference herein.

BACKGROUND OF THE INVENTION

This invention relates generally to the field of carpules, also known as ampoules, which are small, sealed containers, normally made of glass, containing a dose of liquid medicine, anesthesia or the like and which is to be injected by syringe into a patient. A typical carpule comprises a generally tubular, open-ended glass member having a synthetic polymer (e.g., silicone) or rubber plunger or piston inserted in one end. The opposite end of the tubular glass member is typically provided with a disc-shaped plug member, also known as a stopper, septum, diaphragm or seal, which is also composed of rubber or a synthetic polymer (e.g., silicone) and is retained on the tube by a crimped metal collar having an open center. It is also known to secure the plug to the tubular member using adhesives. To inject the liquid contained in the carpule into the patient, the carpule is placed into a syringe apparatus such that the rearward-facing sharpened cannula of an injection needle pierces the seal. A ram is then advanced against the plunger such that the liquid is forced from the carpule and out through the needle.

It is an object of this invention to provide a carpule having a tubular body that is composed of a polymer rather than glass, and to provide a method of manufacturing such a carpule wherein the seal is secured to the tubular body in a novel manner.

SUMMARY OF THE INVENTION

The invention is a carpule comprising a generally tubular main body composed of a relatively rigid polymer, such as for example a polypropylene. A plunger or piston is retained within the tubular body and seals one end of the tubular body in a manner that allows the plunger to be advanced within the tubular body upon the exertion of external pressure upon the plunger, the plunger being composed of resilient polymer, such as for example a thermoplastic vulcanizate (TPV) material such as sold under the brand SANTOPRENE TPV, silicone or the like. A seal, plug, stopper, septum or diaphragm is disposed on, at or adjacent the end of the tubular body opposite from the plunger end. The seal is also composed of a resilient polymer, such as for example a TPV such as SANTOPRENE TPV, silicone or the like, having properties such that the sharpened cannula of an injection needle can be inserted through the seal to open a passage for flow of liquid medicine or the like retained within the tubular body through the needle when the plunger is advanced into the tubular body. The opening in the seal created by the cannula is preferably self-sealing upon removal of the cannula. The seal is secured to the tubular body by fused bonding of the seal material to the body material.

To manufacture the carpule a multi-piece mold is provided wherein the main mold cavity defines the shape of the tubular body. Polypropylene or a material possessing similar desired properties is injected into the mold cavity. Prior to the polypropylene fully curing, the mold is reconfigured, such as by removing the injection cap portion of the mold at the seal end of the tubular body replacing it with a second injection cap. The second injection cap portion is structured such that a seal cavity is created at the seal end of the tubular body, the seal cavity being defined by at least one or more surfaces of the polypropylene tubular body. A TPV or a material possessing similar desired properties is then injected into the seal cavity, resulting in a portion of the injected seal material being in contact with a portion of the partially cured tubular body. Both the polypropylene and the seal material are then allowed to fully cure, after which the mold is disassembled and the combined tubular body and seal is removed. The liquid is then loaded into the tubular body and the plunger inserted through the open plunger end of the tubular body.

BRIEF DESCRIPTION OF THE DRAWINGS

FIG. 7 is a partial cross-sectional view of an alternative mold prior to injection of the polymer.

FIG. 8 is a partial cross-sectional view of the mold of FIG. 7, wherein the first injection cap has been replaced by a second injection cap and the first mold insert member has been replaced by a second insert member after injection of the polymer to form the tubular body, shown prior to injection of the seal material to form the seal member.

FIG. 9 is a partial cross-sectional view of a carpule formed in the mold of FIGS. 7 and 8 showing the seal as having an internal anchoring lip.

DETAILED DESCRIPTION OF THE INVENTION

With reference to the drawings, the invention will now be described in detail with regard to the preferred embodiment and the best mode. In general, the invention is a carpule or ampoule that is a component of a hypodermic injection system for the delivery of liquid medicine, anesthesia or the like, the carpule being a generally elongated tubular container that is received by a syringe in a manner whereby a seal disposed at one end of the tubular body may be pierced by the sharpened rearward-facing cannula of an injection needle, and whereby a plunger disposed within the tubular body can be advanced toward the seal to eject any contents from the carpule out through the needle. Such systems are well known in the art. The invention more particularly comprises a carpule wherein the tubular body is composed of a relatively rigid polymer, such as a polypropylene or a like material of similar desirable properties, and wherein the seal, composed of a resilient polymer, such as a TPV, for example SANTOPRENE TPV, silicone or a material of similar desirable properties, is self-bonded to the tubular body such that a chemical bond occurs between the tubular body material and the seal material, both materials having been placed into contact with the other prior to full curing of either material. The invention further comprises a carpule made by the particular process set forth below, and the manufacturing method itself.

Figure 3:
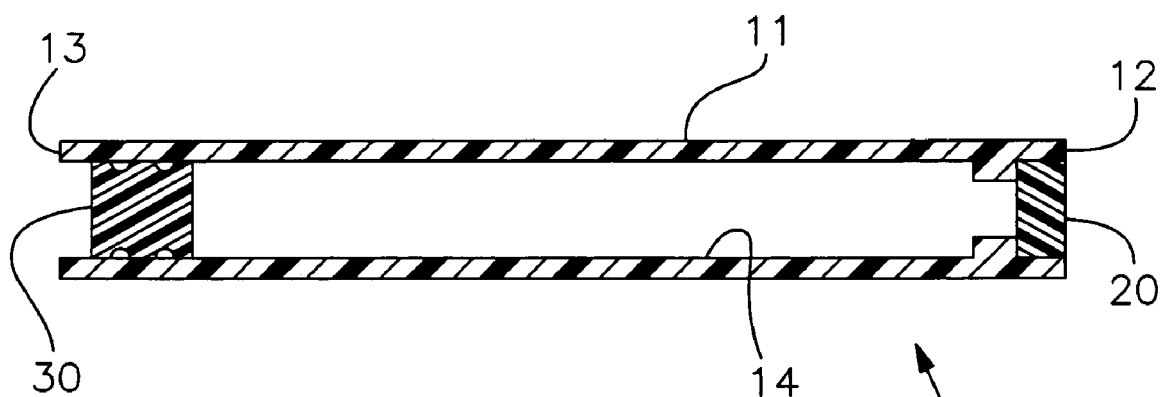
FIG. 3 is a cross-sectional view of a carpule formed in the mold of FIGS. 1 and 2 showing the seal disposed on the seal end of the tubular body and the plunger disposed within the tubular body.
Figure 4:
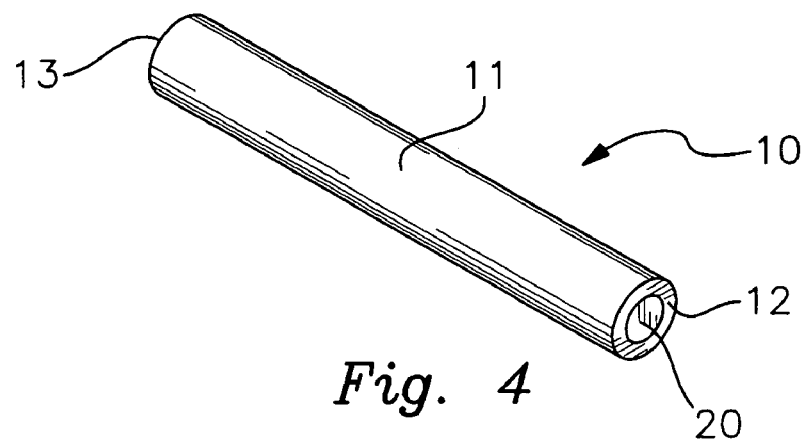
FIG. 4 is a perspective view of the carpule of FIG. 3.

Referring to FIGS. 3 and 4, the carpule 10 is shown as comprising a tubular main body 11 open on both ends and having a seal end 12 that is closed by seal member 20 and a plunger end 13 that provides access to a plunger member 30 disposed within the bore 14 of the tubular body 11. The tubular body 11 is composed of a rigid plastic, which may be transparent, translucent or opaque, that is suitable for processing by injection molding and is suitable for medical use as it will be in contact with medicines, anesthesia and similar liquids retained within the carpule 10. Polypropylene and polystyrene are examples of suitable thermoplastic polymers, and any like material may be utilized provided the material forming the tubular body is capable of chemically bonding with the non-cured seal material when the tubular body material is only partially cured, yet is sufficiently rigid to function as part of the mold cavity receiving the injected seal material. The tubular body 11 is relatively thin-walled and defines an internal bore 14.

The plunger member 30 is a piston-like member that seals off the plunger end 13 of the tubular body 11, but which may be advanced within the bore 14 toward the seal member 20 by an axially inserted ram device or other means, whereby the liquid retained within the carpule 10 will be forced through the needle. The plunger member 30 is composed of an elastomeric, thermoplastic polymer, such as for example a silicone, a TPV such as SANTOPRENE TPV or similar material suitable for injection molding processing and suitable for medical use. A disc-shaped seal member 20, which may also be referred to as a plug, septum, diaphragm or similar terminology, is disposed within or on the open seal end 12 of the tubular body 11. The seal member 20 is composed of an elastomeric, thermoplastic polymer, such as for example a TPV, such as SANTOPRENE TPV or similar material suitable for injection molding processing and suitable for medical use. The seal member 20 is preferably self-sealing when breached, such that any opening created in the seal member 20 by a piercing implement closes upon removal of the piercing implement to retain any liquids remaining within the carpule 10. As will be explained in more detail later, the seal member 20 is fusion bonded to the tubular body 11 such that the seal member 20 is securely retained thereon without the need for adhesives, crimped metal collars or the like. The seal member 20 is such that a sharpened cannula or piercing member of a needle may be forced through the seal member 20 to create a flow passage such that liquids retained within the carpule 10 may be ejected through the needle.

Figure 1:
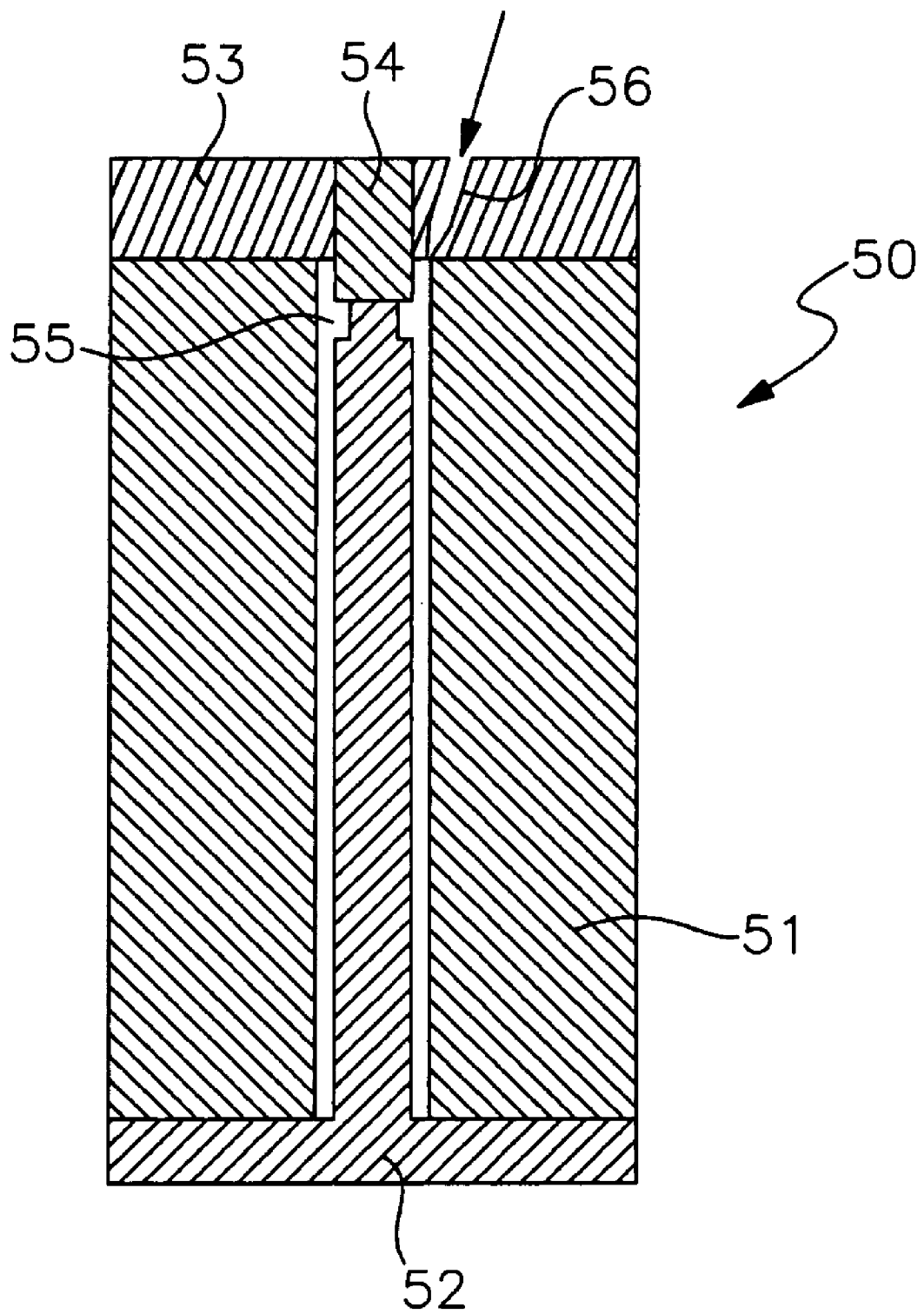
FIG. 1 is a cross-sectional view of a mold prior to injection of the polymer.
Figure 2:
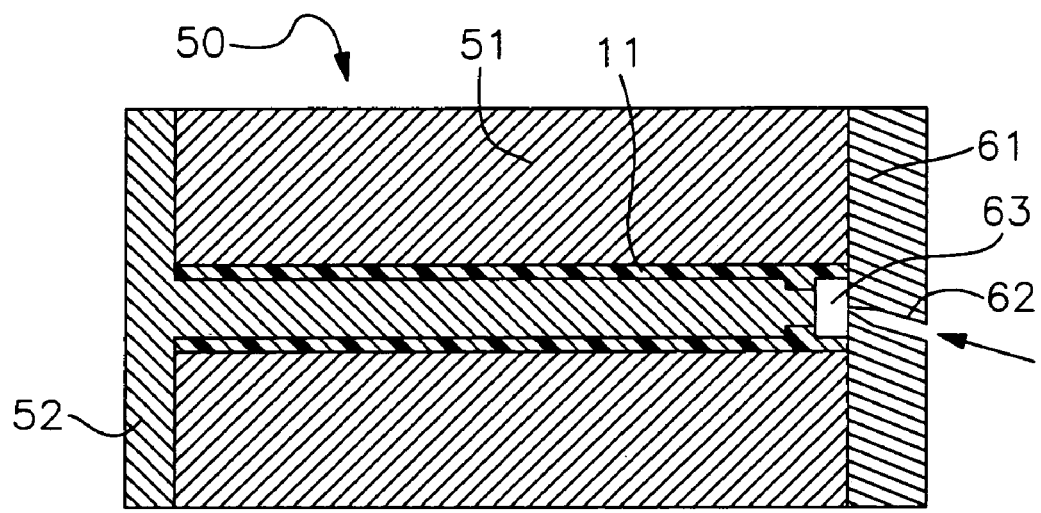
FIG. 2 is a cross-sectional view of the mold wherein the first injection cap has been replaced by a second injection cap after injection of the polymer to form the tubular body, shown prior to injection of the seal material to form the seal member.
Figure 10:
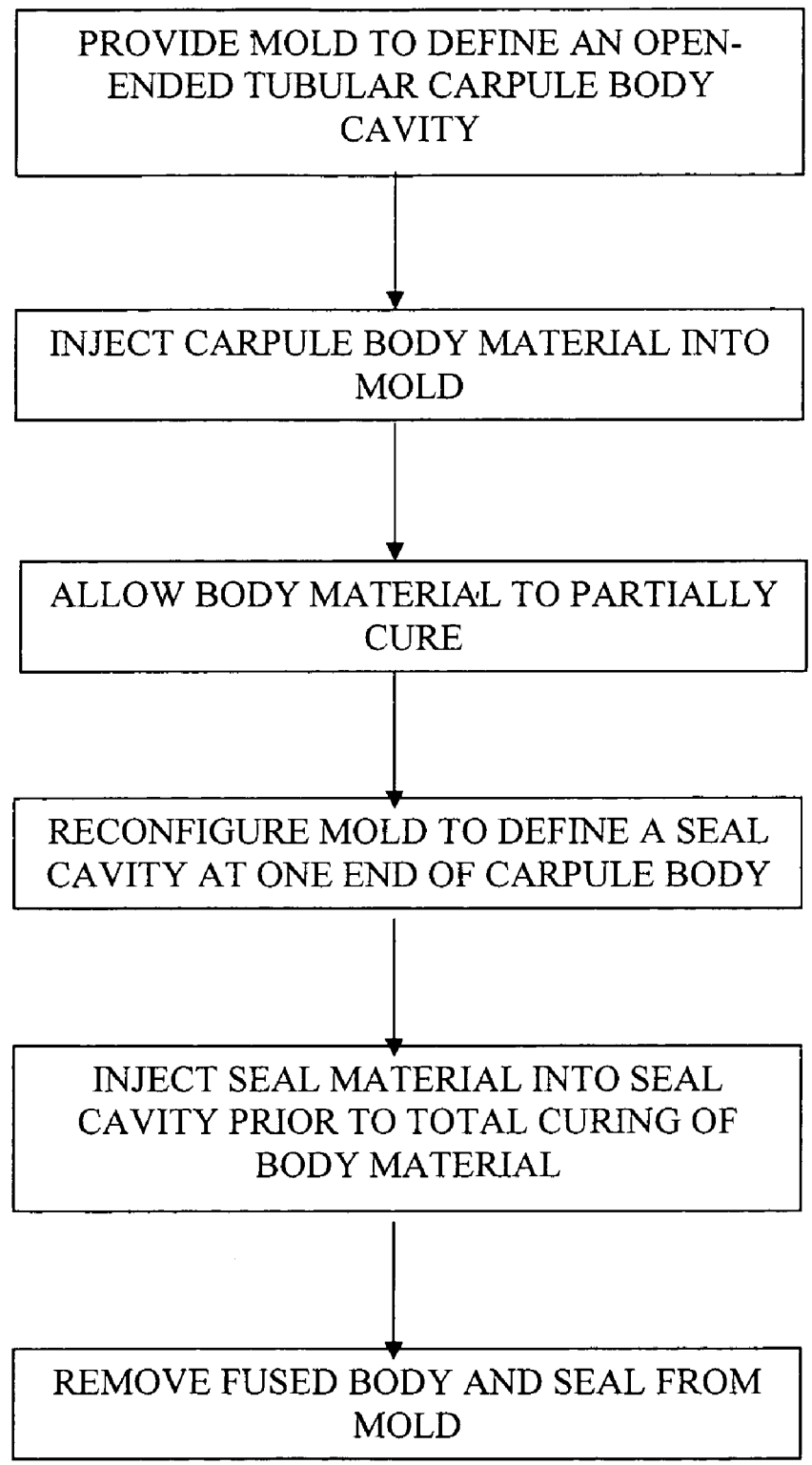
FIG. 10 is a flow chart illustrating steps of the manufacturing method.

Referring now to FIGS. 1 and 2, one embodiment of the mold system for the manufacturing method using injection molding processing techniques is illustrated, the method steps being summarized generally in FIG. 10. A multi-piece mold 50 is provided, the mold 50 comprising a main body 51, an insert member 52, a first injection cap member 53 and a pin member 54 (although the pin member 54 may be formed integrally as part of the cap member 53), which in combination define a body cavity 55 that forms the tubular body 11 of the carpule 10. In known manner the polymer material composing the tubular body 11 is injected into the body cavity 55. For example, polypropylene is injected at a temperature of about 190 to 230 degrees C. When the polypropylene has partially cured to a point where structural rigidity sufficient to maintain its shape is present in the tubular body 11, the mold 50 is reconfigured. For example, the first injection cap member 53 and the mold main body 51 are separated and a second injection cap member 61 is mated with the mold main body 51, as shown in FIG. 2. The second injection cap member 61 is structured such that a seal cavity 63 is defined by the combination of partially cured tubular body 11, the insert member 52 remaining within the tubular body 11 and the second injection cap member 61. It is critical that the seal cavity 63 comprise at lease a portion of the partially cured tubular body 11, i.e., that a portion of the partially cured polymer composing the tubular body 11 be exposed within the seal cavity 63. Prior to complete cooling of the polypropylene, preferably when the polypropylene has cooled to no less than about 87 degrees C., seal material, such as for example a TPV at a temperature of between about 175 to 230 degrees C. is injected through injection port 62 into seal cavity 63. Because the polypropylene is only partially cured, the injected TPV that comes into contact with the polypropylene fuses and self-bonds to the polypropylene as it cures, creating a significantly durable chemical bond between the TPV seal member 20 and the polypropylene tubular body 11. After the polypropylene and TPV have both sufficiently cured, the mold 50 is disassembled and the carpule 10 is removed.

Figure 5:
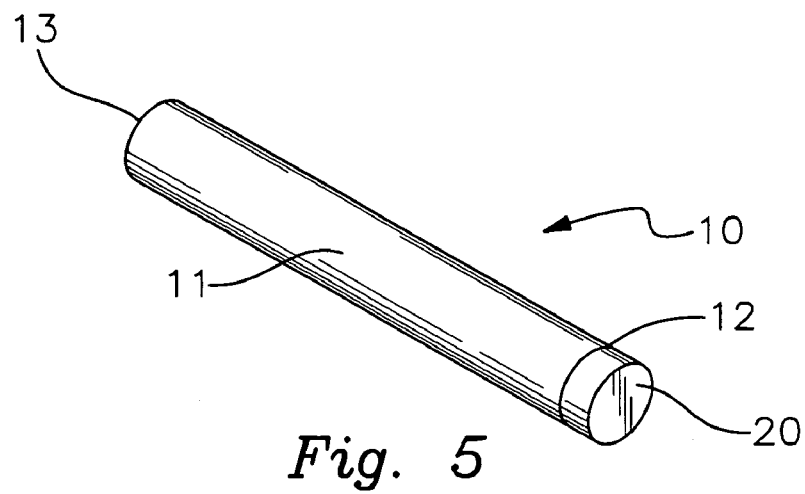
FIG. 5 is a perspective view of an alternative embodiment of the invention, wherein the seal is a cap-like member mounted onto the reduced neck of the tubular body.
Figure 6:
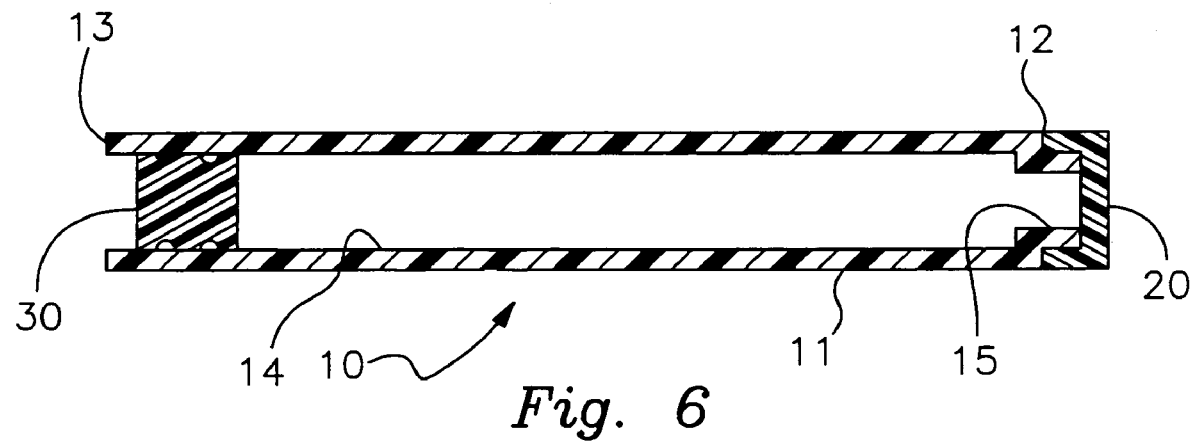
FIG. 6 is a cross-sectional view of the carpule of FIG. 5.

Referring now to FIGS. 5 and 6, an alternate embodiment for the carpule 10 is illustrated. In this embodiment, the tubular body 11 is provided with a reduced neck member 15 at the seal end 12, such that the seal member 20 is formed about the cylindrical exterior of the neck member 15, using a suitably designed mold 50. The fusion bond between the TPV seal member 20 and the tubular body 11 is further enhanced in this design by virtue of the inherent shrinkage that occurs when the TPV cures, such that the seal member 20 constricts about the neck member 15.

Referring now to FIGS. 7 through 9, still another alternative embodiment for the invention and methodology is illustrated. In this embodiment, the tubular body 11 further comprises an internal annular shoulder 16 positioned near the seal end 12. The internal annular shoulder 16 is configured such that diameter of bore 14 is larger on the side of the internal annular shoulder 16 facing away from the seal end 12. The tubular body 11 is formed in similar manner as set forth above, wherein the mold 50 comprises a main body 51 receiving a first insert member 52, a first injection cap member 53 and a pin member 54 (separate or integral with the cap member 53), all in combination defining a body cavity 55. After the body material has been injected and partially cured to form the tubular body 11, the mold 50 is reconfigured, i.e., the first insert member 52 is replaced with a second insert member 71, this insert member 71 having an end 57 of reduced diameter, and the first injection cap member 53 is replaced with a second injection cap member 61, such that a seal cavity 63 is now defined, as shown in FIG. 8. The seal cavity 63 in this embodiment extends into the tubular body 11 a short distance past the annular shoulder 16, such that when the seal material is injected into the mold 50, a portion of the seal 20 extends across the open seal end 12 and a portion of the seal 20 extends along the interior wall of the tubular member 11 and ends in an anchoring lip 21 that is disposed abutting the internal annular shoulder 16, as shown in FIG. 9. This embodiment increases the amount abutting surface area between the seal member 20 and the tubular body 11, such that the chemical fusion bond created once both materials fully cure is stronger, and also mechanically secures the seal 20 to the tubular body 11, the anchoring lip 21 providing resistance to any movement in the direction of the seal end 12. Likewise, the external annular shoulder 17 provides resistance to movement of the seal 20 in the opposite direction.

It is understood that equivalents and substitutions for elements and components set forth above may be obvious to those skilled in the art, and therefore the true scope and definition of the invention is to be as set forth in the following claims.

We claim:

1. A method of manufacturing a carpule having a tubular body, a seal end and a seal member closing said seal end of said tubular body, comprising the steps of:
   providing a mold defining a tubular body cavity;
   injecting a first polymer into said body cavity to form said tubular body and allowing said first polymer to partially cure;
   reconfiguring said mold to define a seal cavity such that a portion of said first polymer is exposed within said seal cavity;
   injecting a second polymer into said seal cavity to form said seal member, wherein said second polymer contacts said first polymer while said first polymer is only partially cured;
   allowing said first and said second polymers to fully cure.

2. The method of claim 1, wherein said step of providing a mold defining a tubular body cavity comprises providing a mold having a main body, an insert member and a first injection cap member, and
   wherein said step of reconfiguring said mold to define a seal cavity comprises replacing said first injection cap member with a second injection cap member.

3. The method of claim 1, wherein said step of reconfiguring said mold to define a seal cavity comprises defining said seal cavity such that said seal cavity is internal to said tubular body.

4. The method of claim 1, wherein said step of reconfiguring said mold to define a seal cavity comprises defining said seal cavity such that said seal cavity is external to said tubular body.

5. The method of claim 1, wherein said step of providing a mold defining a tubular body cavity comprises defining said tubular body cavity to have an internal annular shoulder and a bore, wherein the diameter of said bore is larger on the side of said internal annular shoulder facing away from said seal end, and
   wherein said step of reconfiguring said mold to define a seal cavity comprises defining said seal cavity such that said seal cavity is internal to said tubular body and such that said internal annular shoulder is exposed within said seal cavity.

6. A carpule manufactured by the method of claim 1.

7. The method of claim 1, further comprising the steps of choosing said first polymer from the group of polymers that cure into a rigid state and choosing said second polymer from the group of polymers that cure into an elastomeric state.

8. The method of claim 7, wherein said step of choosing said first polymer comprises choosing said first polymer from the group of polymers consisting of polypropylene and polystyrene.

9. The method of claim 7, wherein said step of choosing said second polymer comprises choosing said second polymer from the group of polymers consisting of thermoplastic vulcanizates.

10. A method of manufacturing a carpule having a tubular body and a seal member closing one end of said tubular body, comprising the steps of:
    providing a mold defining a tubular body cavity;
    injecting a first polymer into said body cavity to form said tubular body and allowing said first polymer to partially cure;
    reconfiguring said mold to define a seal cavity wherein a portion of said tubular body defines a part of said seal cavity;
    injecting a second polymer into said seal cavity to form said seal member, wherein said second polymer contacts said portion of said tubular body while said first polymer is only partially cured;
    allowing said first polymer to fully cure into a rigid state and said second polymer to fully cure into an elastomeric state.

11. The method of claim 10, wherein said step of providing a mold defining a tubular body cavity comprises providing a mold having a main body, an insert member and a first injection cap member, and
    wherein said step of reconfiguring said mold to define a seal cavity comprises replacing said first injection cap member with a second injection cap member.

12. The method of claim 10, wherein said step of reconfiguring said mold to define a seal cavity comprises defining said seal cavity such that said seal cavity is internal to said tubular body.

13. The method of claim 10, wherein said step of reconfiguring said mold to define a seal cavity comprises defining said seal cavity such that said seal cavity is external to said tubular body.

14. The method of claim 10, wherein said step of providing a mold defining a tubular body cavity comprises defining said tubular body cavity to have an internal annular shoulder and a bore, wherein the diameter of said bore is larger on the side of said internal annular shoulder facing away from said seal end, and
    wherein said step of reconfiguring said mold to define a seal cavity comprises defining said seal cavity such that said seal cavity is internal to said tubular body and such that said internal annular shoulder defines a portion of said seal cavity.

* * * * *